US008526731B2

(12) United States Patent  (10) Patent No.: US 8,526,731 B2
Li et al.  (45) Date of Patent: Sep. 3, 2013

(54) HOUGH TRANSFORM METHOD FOR LINEAR RIBBON AND CIRCULAR RING DETECTION IN THE GRADIENT DOMAIN

(75) Inventors: Xinju Li, San Jose, CA (US); Simon Chen, San Jose, CA (US); Jen-Chen Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/621,180

(22) Filed: Sep. 15, 2012

(65) Prior Publication Data

US 2013/0011057 A1 Jan. 10, 2013

Related U.S. Application Data

(62) Division of application No. 12/276,101, filed on Nov. 21, 2008, now Pat. No. 8,320,670.

(60) Provisional application No. 61/093,176, filed on Aug. 29, 2008.

(51) Int. Cl.
*G06K 9/46* (2006.01)
(52) U.S. Cl.
USPC ............................ 382/168; 382/199; 382/281
(58) Field of Classification Search
USPC ........................ 382/168, 199, 276, 190, 281
See application file for complete search history.

(56) References Cited

U.S. PATENT DOCUMENTS

| | | | |
|---|---|---|---|
| 3,069,654 A | 12/1962 | Hough | |
| 5,220,621 A | 6/1993 | Saitoh | |
| 5,960,371 A | 9/1999 | Saito et al. | |
| 6,035,056 A | 3/2000 | Karssemeijer | |
| 6,298,157 B1 | 10/2001 | Wilensky | |
| 6,419,638 B1 * | 7/2002 | Hay et al. | 600/558 |
| 6,711,293 B1 | 3/2004 | Lowe | |
| 6,826,311 B2 | 11/2004 | Wilt | |
| 6,901,171 B1 | 5/2005 | Dutta-Choudhury et al. | |
| 7,016,552 B2 | 3/2006 | Koyama | |
| 7,416,302 B2 * | 8/2008 | Tisse | 351/209 |
| 8,320,670 B1 | 11/2012 | Li et al. | |
| 2009/0016608 A1 | 1/2009 | Fujimoto et al. | |
| 2010/0034423 A1 | 2/2010 | Zhao et al. | |

OTHER PUBLICATIONS

Guo et al. "Adaptive Randomized Hough Transform for Circle Detection Using Moving Window." International Conference on Machine Learning and Cybernetics, Aug. 13, 2006, pp. 3880-3885.*
"6.1.3 Subpixel Accuracy Edge Detection Methods", *Keith Price Bibliography*, (Aug. 27, 2008), 6 pages.
"7.3 Edge Detection", Wolfram Research Inc., (2008), 6 pages.
"Edge Detection", *Wikipedia*, (Jul. 17, 2008), 9 pages.
"Edge Detection", Wolfram Research Inc., (2008), 6 pages.

(Continued)

*Primary Examiner* — Jon Chang
(74) *Attorney, Agent, or Firm* — Wolfe-SBMC

(57) ABSTRACT

A method for converting a portion of an image from a first domain to a second domain. The method may apply a Hough transform on the converted portion of the image, including calculating a range of angles for each tested pixel q relative to a center pixel p, quantizing the range of angles into a plurality of bins, voting each tested pixel q using a range of bins using a weighted voting schema; and detecting one or more features in the portion of the image. The methods may be implemented by program instructions executing in parallel on CPU(s) or GPUs.

24 Claims, 8 Drawing Sheets

(56) References Cited

OTHER PUBLICATIONS

"Edges: Gradient Edge Detection", Gradient Edge Detection.htm, (Jul. 4, 1996), 2 pages.
"Hough Transform", retrieved from Wikipedia on Mar. 11, 2011, (Aug. 8, 2008), 7 pages.
"Hough Transform", Version 11 PlanetMath.org, (Aug. 6, 2006), 5 pages.
"Non-Final Office Action", U.S. Appl. No. 12/276,101, (Apr. 9, 2012), 8 pages.
"Notice of Allowance", U.S. Appl. No. 12/276,101, (Jul. 20, 2012), 8 pages.
"Restriction Requirement", U.S. Appl. No. 12/276,101, (Feb. 2, 2012), 6 pages.
"V.Edge.Type System Parameter", retrieved from <www1.adept.com/main/ke/dataNPlus/AdeptVision_ReferenceN.EDGE.TYPE_p.html> on Mar. 11, 2011, 3 pages.
Agarwala, Aseem "Efficient Gradient-Domain Compositing Using Quadtrees", *In Proc. of ACM SIGGRAPH*, (2007), 5 pages.
Agrawal, Amit et al., "An Algebraic Approach to Surface Recontruction from Gradient Fields", available at <http://www.cfar.umd.edu/~aagrawal/integrability_iccv05.pdf>, (2005), 8 pages.
Ashbrook, et al., "Tutorial: Algorithms for 2-Dimensional Object Recognition", Tina Memo No. 1996-003, Internal, (1998), 15 pages.
Ballard, "Generalizing the hough transform to detect arbitrary shapes", *Pattern Recognition,* vol. 13, No. 2, (1981), pp. 111-122.
Duda, Richard O., et al., "Use of the Hough Transformation to Detect Lines and Curves in Pictures", *Technical Note 36, Published in the Comm. ACM,* vol. 15, No. 1, (Jan. 1972), 18 pages.
Hasan-Shafique, Khurram "CAP5415 Computer Vision", available at <http://www.cs.ucy.edu/courses/cap6411/cap5415/>, (2003), 27 pages.
Kasturi, Rangachar et al., "Document Image Analysis: A Primer", *Sadhana* vol. 27, Part 1, (Feb. 2002), pp. 3-22.
McCann, et al., "Real-Time Gradient-Domain Painting". *ACM SIGGRAPH 2008 papers (SIGGRAPH '08). ACM,* New York, NY, USA, Article 93, 7 pages., (2008), 7 pages.
Moon, Hankyu "Optimal Edge-Based Shape Detection", available at <http://www.umiacs.umd.edu/~raghuram/ENEE731/EdgeDetection/MoonChellappa.pdf>, (Feb. 21, 2001), 14 pages.

\* cited by examiner

FIG. 4A — 400

| 404 | | | | | 408 | | 410 | | | |
|---|---|---|---|---|---|---|---|---|---|---|
| 0 | 0 | 0 | 0 | 0 | 0 | 150 | 255 | 255 | 200 | |
| 0 | 0 | 0 | 0 | 60 | 200 | 255 | 255 | 60 | | |
| 0 | 0 | 0 | 200 | 255 | 255 | 255 | 150 | 0 | | |
| 0 | 200 | 255 | 255 | 200 | 0 | 0 | 0 | | | |
| 150 | 255 | 255 | 200 | 60 | 0 | 0 | 0 | | | |
| 255 | 255 | 200 | 60 | 0 | 0 | 0 | 0 | | | |
| 255 | 255 | 60 | 0 | 0 | 0 | 0 | 0 | | | |

| 404B | | | | 408B | 410B | | | |
|---|---|---|---|---|---|---|---|---|
| 0 | 0 | 0 | 0 | [1.2302 1.9098] | [1.5692 2.2127] | [1.8762 2.4382] | [2.1167 2.5925] | 0 |
| 0 | 0 | 0 | [3.7835 4.7108] | [1.0464 2.0936] | [1.5692 2.4965] | [1.9932 2.7160] | [2.2710 2.8330] | 0 |
| 0 | 0 | 0 | [3.1400 4.7108] | [0 6.2800] | [1.5692 3.1400] | [2.2127 3.1400] | 0 | 0 |
| 0 | [5.7564 6.8036] | [0 6.2800] | [0 6.2800] | [0 6.2800] | 0 | 0 | 0 | |
| [5.6365 6.2800] | [5.3527 6.2800] | [4.7092 6.2800] | [4.7092 5.6365] | 0 | 0 | 0 | 0 | |
| [5.4110 5.9730] | [5.1332 5.8560] | [4.7092 5.5782] | [4.7092 5.3527] | 0 | 0 | 0 | 0 | |
| [5.2567 5.7325] | [5.0162 5.5782] | 0 | 0 | 0 | 0 | 0 | 0 | |

| 404C | | | | 402C | 410C | | | |
|---|---|---|---|---|---|---|---|---|
| 0 | 0 | 0 | 0 | [1, 3] | [2, 3] | [2, 3] | [3, 4] | 0 |
| 0 | 0 | 0 | [6, 7] | [1, 3] | [2, 3] | [8, 9] | [3, 4] | 0 |
| 0 | 0 | 0 | [5, 7] | [0, 9] | [2, 5] | [3, 5] | 0 | 0 |
| 0 | [9, 9] [0, 0] | [0, 9] | [0, 9] | [0, 9] | 0 | 0 | 0 | |
| [8, 9] | [8, 9] | [7, 9] | [7, 9] | 0 | 0 | 0 | 0 | |
| [8, 9] | [8, 9] | [7, 8] | [7, 8] | 0 | 0 | 0 | 0 | |
| [8, 9] | [8, 9] | [7, 8] | 0 | 0 | 0 | 0 | 0 | |

*415C*  *402B*

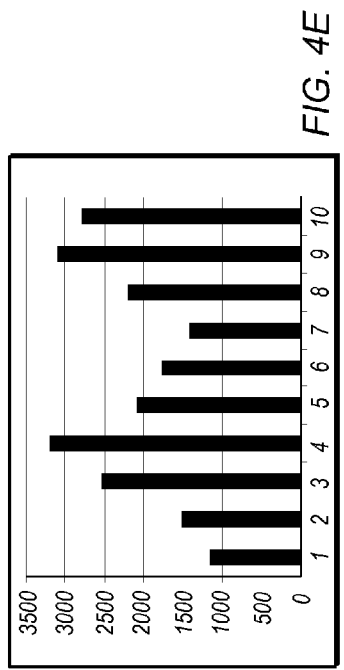
FIG. 4D
FIG. 4E
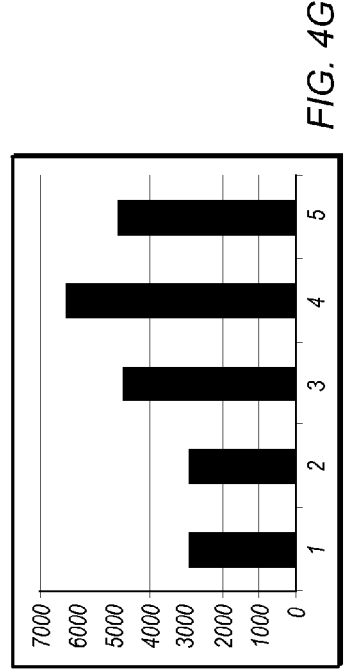
FIG. 4F
FIG. 4G

HOUGH TRANSFORM METHOD FOR LINEAR RIBBON AND CIRCULAR RING DETECTION IN THE GRADIENT DOMAIN

RELATED APPLICATIONS

This application is a divisional of and claims priority to U.S. application Ser. No. 12/276,101, filed Nov. 21, 2008, which in turn claims priority to U.S. Provisional Patent Application No. 61/093,176, the disclosures of which are incorporated by reference herein in their entirety.

FIELD OF THE INVENTION

The present invention is directed to computer systems. More particularly, it is directed to image processing and computer vision.

DESCRIPTION OF THE RELATED ART

Image processing often involves the detection of various linear and circular image features in image data. For example, linear and circular image feature detections may be used in many image processing and computer vision applications. Linear features may include features such as straight lines, edges and corners. Circular features may include features such as circular arcs, ellipses, among others.

Variations of Hough transform have been widely used in image processing applications. The Hough transform is a robust method for detecting such both linear and circular image features, even in the presence of significant noise in the image. The basic idea of the Hough transform is to translate the original feature detection problem into an equivalent problem of peak detection in the parametric space for the lines and circular arcs. Because of this parametric analytic formulation, many existing Hough transform methods assume zero stroke width (or 1-pixel width in a discrete realm) for the line and circular image features. However, this assumption does not typically hold for the natural scenes.

Another issue is that most linear and circular feature detectors use edge operators, such as the Sobel operator, which usually do not generate a single pixel response, even in the best case scenario of an idealized step edge. To workaround this issue, many existing algorithms employ some pre-processing steps of thinning or non-maximization suppression to reduce the edge to single pixel width responses before Hough transform is applied.

SUMMARY

A system and method for a performing a Hough transform that is able to detect features having a definite width, such as a linear ribbon and/or a circular ring, among others. The method may include relaxing the original Hough transform formulation to account for a finite stroke width in the input linear or circular features, such as a ribbon or ring feature. The method may also normalize gradient magnitudes as weights in the Hough transform vote accumulation step. The use of weights may take advantage of varied strength of edges in an image, and thus produce better results. Thus the method may perform a Hough transform formulation in the context of edge and corner detection. The method may detect linear ribbons of arbitrary stroke width. The method may also detect other parametric shapes such as circular arcs and ellipses, among others.

The method may transform an image, such as a stored and/or acquired image, into another domain and/or parametric space. In some embodiments, the image may be transformed into a gradient domain. The method may apply a sliding window to the image and operate only on the pixels substantially within that sliding window. The method may operate to detect features in the image and/or in the sliding window portion by operating on the transformed image.

The Hough Transform may be also applied to warped images, i.e., in conjunction with a camera lens calibration and/or correction methods for detection of linear features, such as lines and/or ribbons, as well as circular features, such as rings. Warped images may be taken with a wide angle lens, such as a fisheye lens, where image lines may become curved. Thus the warped images may be un-warped first prior to applying the Hough Transform (e.g., before transforming the image) to acquired image. The un-warping, or the distortion correction process may generate an un-warped image, and it may use geometric distortion calibration data from a camera lens profile database. The calibration data may be used to correct any geometric distortions in the warped image and remap the source image to an un-warped image as if it was taken with a perspective lens, where the perspective projection is known to preserve linear structure in the original scene as lines in the image.

The method may detect features, such as image corners, by finding intersection of edges in an image (e.g., by using a transformed image). For example, for an image pixel p, the method may first find an edge that passes through this pixel. The method may operate to check most or all the neighbor pixels whose gradient magnitudes may be greater than a threshold within a sliding window centered at the pixel p. However, this check may be omitted in some embodiments. A neighbor pixel q may be defined as "edge pixel" if its gradient direction is more or less consistent with the direction from p to q (or vice-versa).

The edge direction may be represented by one or more parameters, including an angle between a theoretical line joining pixels p & q and the x-axis, however other reference points may be possible. The edge directions may be divided into a plurality of quantization bins. The value of one or more of these bins may be computed by accumulating the normalized gradient magnitudes of the edge pixels that may fall into each respective bin.

The method may detect one or more peaks in the values of the bins. The method may also merge one or more of the peaks together, for example, if the distance between the peaks is smaller than a threshold ($T_\theta$). Furthermore, the method may also merge one or more of the peaks together, for example, if the one or more peaks which are greater than another threshold ($T_G$) can also be qualified as edge pixels. In some embodiments, the method may also find any intersection of the edges. For example, if the method detects two or more peaks at an exemplary image pixel p, this pixel p may be detected as a "corner candidate" and a score may be assigned to indicate the relative strength of that corner candidate.

The method may eliminate some or all of any redundancy that may exist among the corner candidates. Several approaches may be used for this purpose. For example, a local maximum may be used in the Hough transform algorithm. In some embodiments, the method may find the connected components of any close corner candidates, and may use the geometry center and/or a center of gravity to present the detected corner.

The methods described herein may be implemented by program instructions executable by one or more general-purpose processors (CPUs) and/or one or more graphics processing units (GPUs) in different embodiments. In some embodiments, the Hough transform method described herein may be generated by program instructions executing in parallel on one or more CPUs or GPUs configured for parallel execution. For example, voting for the bins may be performed by different threads of an application executing on a CPU configured for multi-threaded execution, or by different GPUs configured to operate in parallel. Similarly, an optional transformation into one or more domains may be performed in parallel on a CPU configured for multi-threaded execution or by different GPUs configured to operate in parallel, in different embodiments. The methods disclosed herein may be implemented by program instructions comprised on one or more computer-readable storage media computer-executable by CPU(s) and/or GPU(s), in various embodiments.

BRIEF DESCRIPTION OF THE DRAWINGS

FIG. 4A is an exemplary matrix of magnitude of gradient values of an exemplary sliding window, according to some embodiments;

FIG. 4B is an exemplary matrix of a range of voting angles for pixels of an exemplary sliding window, according to some embodiments;

FIG. 4C is an exemplary matrix of quantized ranges of voting angles for pixels of an exemplary sliding window, according to some embodiments;

FIG. 4D shows an exemplary histogram with bins corresponding to weighted counting of the quantized ranges of voting angles for pixels of an exemplary sliding window, according to some embodiments;

FIG. 4E is a chart of an exemplary histogram with bins corresponding to weighted counting of the quantized ranges of voting angles for pixels of an exemplary sliding window, according to some embodiments;

FIG. 4F shows an exemplary histogram with merged bins corresponding to weighted counting of the quantized ranges of voting angles for pixels of an exemplary sliding window, according to some embodiments;

FIG. 4G is a chart of an exemplary histogram with merged bins corresponding to weighted counting of the quantized ranges of voting angles for pixels of an exemplary sliding window, according to some embodiments;

Figure 1:
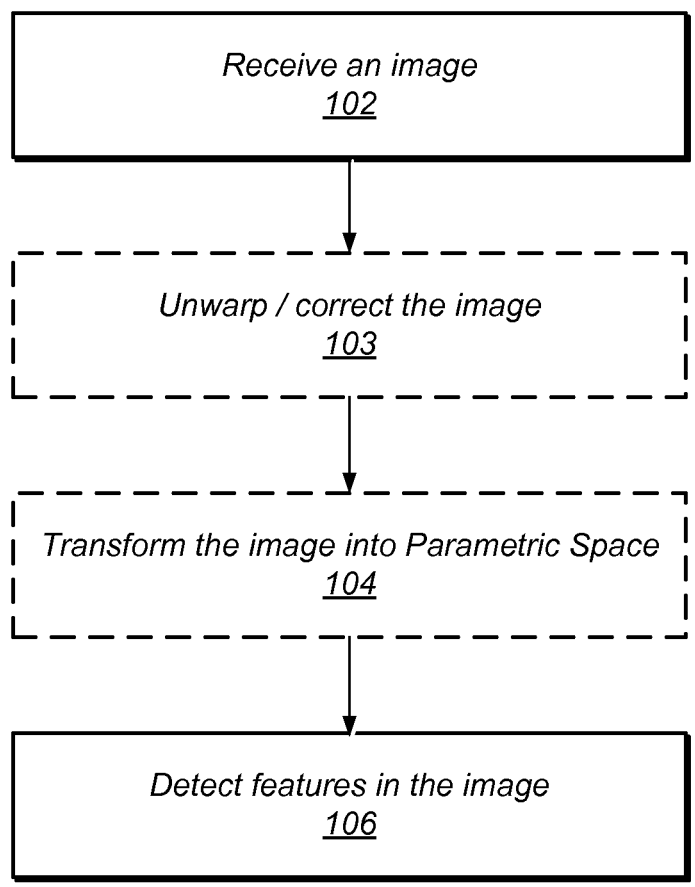
FIG. 1 is a flowchart of an exemplary method for detecting features using a Hough Transform, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and is generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Various computer-implemented methods disclosed herein may be used for detecting features in images using a relaxed Hough transform formulation. The methods may be implemented as part of a graphics application that supports various filtering techniques, such as median filtering and bilateral filtering. The techniques disclosed herein may be executed on graphics processing units (GPUs) and/or CPUs, in various embodiments. For example, a graphics application may include support for transforming an image to another domain, such as a gradient and/or a grayscale domain, performing calculations using a sliding window, applying a weighted histogram counting and/or other operations that include using a relaxed Hough transform formulation, as described herein.

FIG. 1—Method for Detecting Features using a Hough Transform

FIG. 1 illustrates a flowchart of a method for applying an exemplary Hough transform to an image and detecting features, according to some embodiments. The method shown in FIG. 1 may be used in conjunction with any of the computer systems or devices shown in the other Figures, among other devices. In various embodiments, some of the method elements shown may be performed concurrently, in a different order than shown, or may be omitted. Additional method elements may also be performed as desired. As shown, this method may operate as follows.

In 102, the method may receive an image. The image may be any type of a digital image that may be operated on by a user. In some embodiments, an application program may store the image and may allow the user to perform a variety of image processing operations on it, such as applying a Hough transform to detect one or more features in the image. In some embodiments, the user may apply a different tool/transformation that operates to produce a similar and/or analogous result as described herein.

In some embodiments, the user may select one or more portions of an image to operate on instead of performing the relaxed Hough transform on the whole image. In some embodiments, the one or more portions of the image may be selected automatically by the application program depending on the area of the image the user points to. The user may select the one or more desired portions of the image to operate on by using a mouse and/or some other pointing device (e.g., a trackball, a light pen, a tablet, and/or a touch-sensitive screen, among others). Furthermore, in some embodiments, some pre-processing may be performed on the image and/or to an area selected by a sliding window.

In 103, the method may un-warp (e.g., perform a geometric transform of) the received image prior to operating (i.e., prior to transforming the received image into parametric space/ detecting features). Thus the method may apply one or more geometric transforms prior to the Hough transform, or apply the geometric transforms on-the-fly while the Hough transform is applied. For example, warped images may be taken using a wide-angle lens, such as a fisheye lens, and thus may have some geometric distortion(s). Furthermore, a regular perspective lens may also produce warped images e.g., if it is not properly calibrated and/or has one or more physical defects. As a result, the linear or circular features in the original scene (of the received image) may not be properly preserved in the captured/ acquired image(s), and thus produce a warped image.

The method may un-warp the warped image prior to applying the rest of the relaxed Hough transform. For example, by properly calibrating one or more of a camera and lens (i.e., that may acquire an image being operated on), it may be possible to characterize any lens distortions and undo that by re-mapping the acquired image(s) into an undistorted perspective projection image space (or any other projections that preserves 3D lines as lines in 2D image). In some embodiments, this un-warping/correction process does not have to happen as a pre-processing step, i.e., it may be applied on-the-fly during the Hough transform process that maps each image pixel (x, y) of the acquired image(s) to a perspective projection image space (x', y'). Thus the same relaxed Hough transform algorithm may be applied to pixels in the un-warped image (x', y') instead of the pixels (x, y) in the original and warped image.

In 104, the image may be transformed into another domain and/or parametric space. In some embodiments, the image may be transformed into a gradient domain, such as into one or more gradient direction matrices (e.g., Dx and Dy matrices) and gradient magnitude matrices. The image may be transformed into the gradient domain using one or more edge operators, such as Sobel operators, Roberts operators, Prewitt operators, Frei Chen operators, Shen Castan operators, Marr and Hildreth operators, Canny operators, and/or any other operator that can be applied to an image to find edges. In some embodiments, the method may operate on the image directly without transforming it into another domain and/or parametric space.

In some embodiments, the method may apply a sliding window to the image and operate only on the pixels substantially within that sliding window. In other words, the edge operators described above may be only applied to a selected area of the image instead of the whole image.

In some embodiments, the image and/or the image portion in the sliding window may be transformed into a grayscale domain instead. In other words, instead of applying an edge operator as described above, the method may convert the image into a grayscale image. In some embodiments, the method may not transform the image and/or the sliding window portion; i.e., the method may operate directly on the image. In some embodiments, the image may contain a plurality of pixels (image pixels) encoded using Red, Green, and Blue (RGB) color space, and the image pixels may be normalized with respect to a color channel, such as the G (Green) color channel.

Thus each pixel in the image, and thus in the sliding window portion, may have associated color channels, e.g., have an associated color space. For example, each pixel may have an associated RGB value. In some embodiments more than one color space may be used for one or more of the pixels in the image and/or in the selected image area. The one or more color spaces may include the Hue, Saturation, and Value (HSV) color space, the Lab Color Space (CIELAB), the International Commission on Illumination 1931 XYZ color space (CIEXYZ), any of the variants of the CIE XYZ color space, the RGB Alpha (RGBA) color space, any of the variants of the Cyan, Magenta, Yellow, and Key (CMYK) color space, the YIQ (luma/luminance, in-phase, and quadrature components) color space, the YPbPr color space, any of the variants of YUV (luma/luminance and two chrominance color components) color space, any of the variants of the YCC (luma/ luminance and chroma components) color space, the Hue, Saturation, and Brightness (HSB) color space, the Hue, Saturation, and Lightness/Luminance (HSL) color space, the Munsell color system, the Natural Color System (NCS), the RG Chromaticity space, the color space used in the Human Visual System Model (HVS), and/or any other color space system used to denote color values of pixels in an image.

In 106, the method may operate to detect features in the image and/or in the sliding window portion. As described herein, the method may operate to detect features that have a distinct width, including ribbon and ring detection, among others. As described herein, the method may use multiple bin voting and/or weighted voting with a relaxed Hough transform. This is described in more detail with respect to Figures below, such as elements 204-218 of FIG. 2.

Aligning and Un-Warping Distorted Images

Image correction may be performed as a computer-implemented multi-stage image alignment and un-warping method that may, for example, be applied to the acquired image(s), which may be referred to herein as component images, that include relatively large amounts of distortion in each image, such as images captured using a camera with a wide-angle or fisheye lens, in a computer-automated image stitching process.

Thus to align and un-warp distorted images, an initial un-warping function(s) may be applied to the coordinates of feature points of a set of input component images to generate a set of un-warped, substantially rectilinear, feature points. The substantially rectilinear feature points may be then used to estimate focal lengths, centers, and relative rotations for pairs of the input images. A global nonlinear optimization may be applied to the initial un-warping function(s) and the relative rotations to generate optimized un-warping functions and rotations for the acquired image(s). The optimized un-warping functions and rotations may then be used to render and/or generate a result image (such as a panoramic image), generally in the form of a spherical projection, from the acquired image(s). However, in some embodiments, a processing intermediate step may be utilized where the acquired (and distorted) image(s) are un-warped into an intermediate rectilinear image prior to rendering and/or generating the panoramic image.

In addition, a metadata-driven, automated method for aligning and un-warping distorted images may be used where lens profiles for a variety of lens and camera combinations may be pre-computed and stored. Metadata commonly stored with digital images may be used to automatically determine if a set of component images from which a result image is to be generated include an excessive amount of distortion, and if so, the metadata may be used to determine an appropriate lens profile and un-warping function for an automated aligning and un-warping process.

In some embodiments, the method may register (align) images with excessive distortion, such as images taken with fisheye lenses. Because of the large distortion, conventional alignment workflows, including modeling lens distortion, may not work well on this type of images. Embodiments may also efficiently un-warp distorted images so that they can be stitched together to form a new image, such as a panorama image. In some embodiments, the relaxed Hough transform may be applied to this new image (e.g., the panorama image).

In some embodiments, an un-warping function or functions may be obtained as initial un-warping function(s) in the image alignment and un-warping process. In some embodiments, metadata from the component images may be used to determine a lens profile or profiles that may be used to determine initial un-warping function(s) to be used in an image alignment and un-warping process. A feature extraction and feature matching technique may be performed on each overlapping pair of acquired (component) images to generate a set of feature points for the images. In some embodiments, the feature extraction and feature matching may first detect features in individual acquired images, and then establishes feature correspondences between overlapping pairs of the acquired images. Each feature point may correspond to one feature correspondence from among the established feature correspondences for all of the images, and each feature point includes a set of coordinates established via the feature matching process.

Instead of initially un-warping the component images to generate a very large rectilinear image, initial un-warping function(s) may be applied to the coordinates of the feature points to generate un-warped, substantially rectilinear feature point coordinates. Pair-wise processing may be performed using the substantially rectilinear feature points to estimate initial camera rotations, focal lengths, image centers, and possibly other information for the images. The initial un-warping function(s) may be refined for each image using the estimated focal length and center. A global optimization of the camera rotations and refined un-warping functions may then be performed to generate optimized rotations and optimized un-warping functions. The optimized rotations and optimized un-warping functions may then be input to an alignment, un-warping and stitching process that applies the optimized rotations and optimized un-warping functions to the component images to align, un-warp, and/or stitch the acquired image(s).

The un-warped set of feature points may be referred to as substantially rectilinear feature points because the original coordinates of the feature points may be un-warped to generate coordinates that are nearly or approximately rectilinear, but may not be exactly rectilinear. A reason for the un-warped feature points being termed substantially but not exactly rectilinear is that an initial un-warping function for a particular type (e.g., make and model) of lens may be generated from calibration values obtained by calibrating a particular instance of that type of lens. However, the component images from which the feature points are extracted may have been captured/acquired with a different instance of that type of lens. Generally, lens manufacturers produce particular models of lenses with physical and optical attributes that vary within ranges of tolerance. These ranges tend to be very small, especially for high-quality lenses.

Therefore, there may be small variations between lenses of the same make and model, variations within the range of the manufacturers' tolerances for that type of lens. Thus, while the initial un-warping function used may be very close to the true un-warping function for the actual lens used to capture the component images, the initial un-warping function may actually differ from the true un-warping function for the actual lens in accordance with the range of variation for that type of lens. Thus, the un-warped coordinates of feature points captured with a particular lens may be approximately, or substantially, rectilinear within a range of variation for that type of lens. In addition, environmental and other factors, such as temperature and humidity, may affect camera lenses and cameras in general, and thus some, generally small, variations in distortion may be introduced in captured/acquired images, even using the same lens, under different conditions.

Embodiments of the method for aligning and un-warping distorted images may generate, as output, a result image (e.g., a panoramic image) from the input set of distorted component images. Generally, the output panoramic image may be a spherical projection of the input images; however, other projections, such as cylindrical projections, may also be generated. The method may apply the relaxed Hough transform to the result image.

Embodiments of the method for aligning and un-warping distorted images may be implemented as or in a tool, module, library function, plug-in, stand-alone application, etc. Embodiments are generally described for application to the alignment and un-warping of images captured with lenses that introduce a large amount of pincushion distortion to the images, for example images captured using what are commonly referred to as fisheye lenses. However, embodiments may also be applied to the alignment and un-warping of images with less pincushion distortion than is produced with fisheye lenses, e.g. to images with some pincushion distortion captured using standard or wide-angle lenses. In addition, embodiments may be adapted to align and un-warp images with other types of distortion, such as images with barrel distortion.

Figure 2:
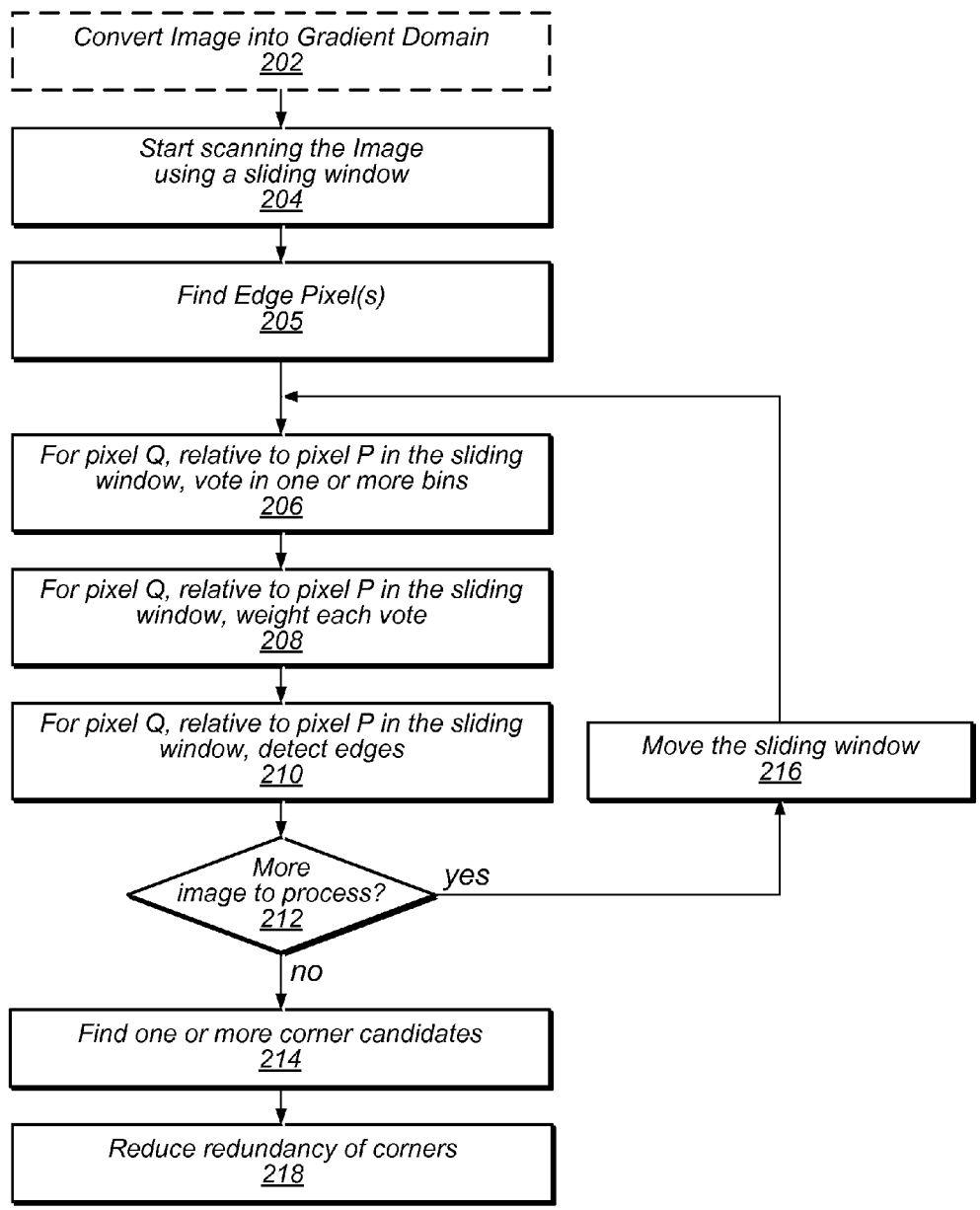
FIG. 2 is a flowchart of a detailed exemplary method for detecting features using a Hough Transform, according to some embodiments.

FIG. 2—Detailed Method for Detecting Features using a Hough Transform

FIG. 2 illustrates a detailed flowchart of a method for applying an exemplary Hough transform to an image and detecting features, according to some embodiments. The method shown in FIG. 2 may be used in conjunction with any of the computer systems or devices shown in the other Figures, among other devices. In various embodiments, some of the method elements shown may be performed concurrently, in a different order than shown, or may be omitted. Additional method elements may also be performed as desired. As shown, this method may operate as follows.

Figure 3:
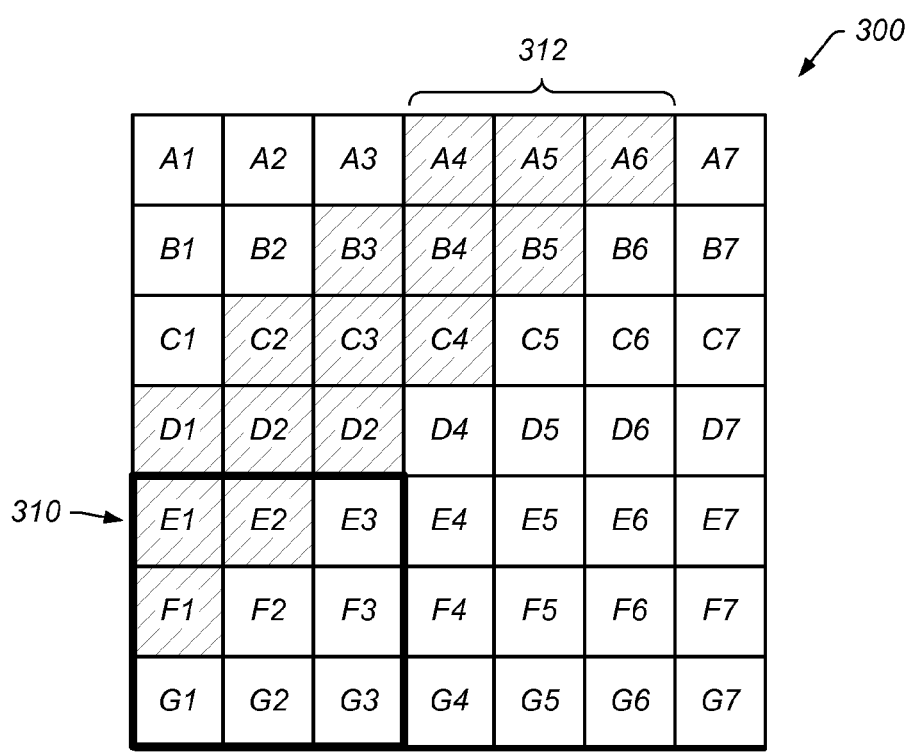
FIG. 3 illustrates an exemplary sliding window that can operate on an image, according to some embodiments.

In 202, the method may convert the image and/or an image portion selected by a sliding window to a gradient domain. As described above, the method may use a variety of edge operators to transform the image and/or an image portion selected by a sliding window to the gradient domain. This conversion 202 may be analogous to element 104 of FIG. 1. Exemplary sliding window is shown in FIG. 3. As described above, the method may be applied to the original acquired image, or to a pre-processed image (e.g., an un-warped image as described in element 103). Furthermore, the method may be applied to a warped image and additional elements of un-warping may be performed on-the-fly, i.e., in conjunction with one or more of the conversion element 202 and/or the calculation/voting elements 206 and 208.

In 204, if the whole image was converted to the gradient domain, the method may operate to move a sliding window to a portion of the image. In some embodiments, elements 202 and 204 may be combined into a single element, i.e., a sliding window may be moved to a location in the image order to select a portion of the image, and then convert the selected portion to one or more of a gradient domain, a gray scale domain, or any other pixel domain. Exemplary results of converting an area selected by a sliding window to the gradient domain are shown in FIG. 4A. Thus in some embodiments, the sliding window may be moved in the original image (or the image after any pre-processing) and the method may operate to convert the area of the sliding window to the gradient domain, the grayscale domain, any other domain, or operate on the pixels in the sliding window directly.

With regard to one or more of the steps below, the method may use a sliding window with a center pixel p, as illustrated in FIG. 4A. The method may operate to perform calculations for most or all of the surrounding pixels in the sliding window relative to the center pixel p. Exemplary pixels p and q are discussed with reference to the Figures below.

In 205, the method may operate to find one or more edge pixels around the center pixel p. In some embodiments, the method may use a threshold $T_M$ to decide which pixels to consider. For example, the method may only consider pixels whose gradient magnitudes are larger than a threshold $T_M$. Furthermore, a first pixel may be found to be an edge pixel q if its gradient direction is approximately orthogonal with the line direction between the center pixel p to the first pixel. In some embodiments, the edge direction may be represented by an angle between a line through pixels p and q and the x-axis. The threshold $T_M$ may be input from a file or user, or it may be calculated automatically. In some embodiments, the method may consider all of the pixels regardless of their gradient magnitude. For each pixel in the window other than the center pixel, a weight function w(alpha) on the pixel's gradient magnitude may be used, where the 'alpha' is the angle between the computed gradient direction and the pq direction (line between the pixel and the center pixel). For example, in one embodiment, the weight function may be w(alpha)=abs[sin(alpha)], which gives the most weight when alpha is PI/2 (perpendicular) and zero weight when alpha is 0 (parallel). Thus, the amount by which a pixel may be considered an edge pixel may be determined according to such a weight and used in conjunction with the weighted voting described below. Detailed explanation for some embodiments of how the method finds edge pixels and edge directions is described below with reference to FIGS. 4A-C.

In 206, the method may operate to vote in one or more bins of a histogram corresponding to angles for one or more possible lines between pixels p and q in the sliding window, according to some embodiments. The method may divide the edge directions around pixel p into quantization bins. The method may decide how an edge pixel q may vote for one or more bins. It is noted that in some embodiments, the method may not use gradient values for determining the angles, and may use grayscale, normalized RGB, or other pixel values instead. In other words, the use of voting for one or more bins using a Hough transform may be applied to calculations in other pixel domains beside the gradient domain. Detailed explanation of how the method votes for the angles using quantized bins is described below with reference to FIGS. 4D-G.

In 208, the method may operate to weigh each vote in the sliding window, according to some embodiments. The method may use the value of each pixel, such as its gradient magnitude, along with the number of votes in each bin, to generate a histogram for one or more of the angle ranges. In other words, the method may use normalized gradient magnitudes to weight pixels' contribution to bins. So the vote for each bin in the histogram may be a sum of normalization gradient magnitudes of the pixels that contribute for that respective bin. Detailed explanation of how the method weighs votes using a histogram is described below with reference to FIGS. 4C-G. It is noted that the method may use two or more histograms to implement these calculations, or it may use one histogram that is being updated continuously. It is understood that there are various data structures that can implement the one or more histograms described herein, such as matrices, tables, linked lists, beside others.

In 210, the method may operate to detect any edges in the sliding window. In some embodiments, after the voting of element 206, the method may combine the votes of bin of θ and the bin of π+θ together, because they may represent the same edge direction (i.e., angle θ separated by π), such as described below with reference to FIGS. 4D and 4F. For example, since the method may vote in a bin for angle θ and for a bin for angle θ (thus voting twice), these two votes may be combined into one cumulative vote.

The method may also find peaks in bins of the histogram based on their votes. The method may merge two or more peaks together to make a stronger edge direction if their distance is smaller than a threshold ($T_θ$). As mentioned above, the threshold $T_M$ may be input from a file/user, or it may be calculated automatically. For example, if pixel p has strong edge directions (e.g., vote larger than a threshold $T_G$), pixel p and its neighbors voted for the edge directions may be detected as edge pixels.

In 212, the method may determine if there are additional areas of the original (or after pre-processing) image that should be processed. If there are, the method may operate to move 216 the sliding window to the next center pixel, such as the next pixel to the right and/or down from the previous pixel in the image. If the method moves 216 the sliding window to the next pixel, the method may perform one or more of elements 206-210 for the next pixel.

In 214, if there are no more pixels to process, then the method may operate to find one or more corner candidates. In some embodiments, after detecting strong edge directions around pixel p, the method may sort any edge directions based on their votes. For example, if the method finds two or more strong edge directions whose angle difference is within a pre-specified minimum and maximum range, then the respective pixel p may be considered as a corner candidate. In some embodiments, the pixel p may be assigned with a vector of the angles of bins and their respective votes $[θ_1, v_1, θ_2, v_2, \ldots, θ_n, v_n]$, where n is the number of a strong edge direction. In some embodiments, element 214 may be calculated for most or all of the pixels in the original image. Thus element 214 may operate to find most or all peaks in the histogram for most or all pixels in the image. For example, if the histogram contains two peaks, such as at 0 and 45 degrees), that may correspond to two intersecting lines (such as intersecting at 45 degrees for the given example). In other words, the histogram bins may determine the direction of the line.

In 218, the method may operate to reduce redundancy of the corner candidates. In some embodiments, the algorithm may find multiple corner candidates near one image corner. To reduce the duplicated candidates, connected components may be used to label the image. The image corner center may be represented as the center of the connected components, or the center of gravity as weighted by the bin votes, or the pixel with a maximal vote (which may be found by comparing $v_1, \ldots, v_n$ as computed in the previous step). Thus the element 218 may operate to localize the corners in the image.

FIG. 3—Exemplary Sliding Window

FIG. 3 illustrates an exemplary sliding window 310 that, when applied to an image 300, contains at least a portion of a beam 312 as shown by the shaded pixels (e.g., pixels E1, E2, and F1). In some embodiments, the contents of the sliding window 310 may be transformed into another pixel domain, such as a gradient domain and/or a grayscale domain. In some embodiments, a relaxed Hough transform described herein may be used to operate directly on normalized RGB values for the pixels in the sliding window (or on pixel values that use another color space system).

FIG. 4A—Matrix of Magnitude of Gradient Values of a Sliding Window

FIG. 4A is an exemplary matrix of magnitude of gradient values of an exemplary sliding window, according to some embodiments. An exemplary sliding window 400 of size 7 pixels by 7 pixels may be applied to an image (such as image 300 of FIG. 3). In some embodiments, the method may calculate the distances and/or angles from a center pixel to other pixels in the sliding window using a typical image processing coordinate system. Thus for the exemplary sliding window of FIG. 4A, the center pixel p 402 may have (x, y) coordinates of (0, 0), a pixel in a left upper corner 404 of the sliding window 400 may have (x, y) coordinates of (−3, −3), and a pixel in a right bottom corner 406 may have (x, y) coordinates of (3, 3). It is noted that the 7 by 7 sliding window is exemplary only, and other windows having different sizes may be used, e.g., 4 by 4, 10 by 10, 20 by 20, 10 by 7, and 20 by 10 pixels, among others.

In some embodiments, as described above, a matrix of magnitude of gradient values may be computed by applying one or more edge operators to the pixels in the sliding window 400. The edge operators may yield one or more directional matrices of gradient values, such as an X axis gradient value matrix and a Y axis gradient matrix. The magnitude m of the directional matrices $(d_x, d_y)$ may be calculated by using the equation $m=\sqrt{d_x^2+d_y^2}$.

In some embodiments, as mentioned above, instead of a matrix with magnitude of gradient values the method may use a matrix of grayscale values. In some embodiments, as mentioned above, the method may use normalized RGB values, or of another color space system.

FIG. 4B—Matrix of a Range of Voting Angles for Pixels of a Sliding Window

FIG. 4B is an exemplary matrix holding values for angle ranges for pixels of an exemplary sliding window, according to some embodiments. In some embodiments, the method may operate to calculate angles between pixel p 402 and one or more of the possible pixels q (e.g., the rest of the pixels in the sliding window). Thus the angles may represent angles of possible beams located between angles $\phi_1$ 560A and $\phi_2$ 560B of FIG. 5A. For example, entry 408B of the matrix 400B contains an angle range of 1.23 radians to 1.91 radians for a range of possible beams between the center pixel p 402 and an edge pixel q 408. As FIGS. 4C-G show, this angle range for pixel 408 is used in voting for edge detection for the possible beams that may be characterized by pixels p 402 and q 408.

Figure 5A:
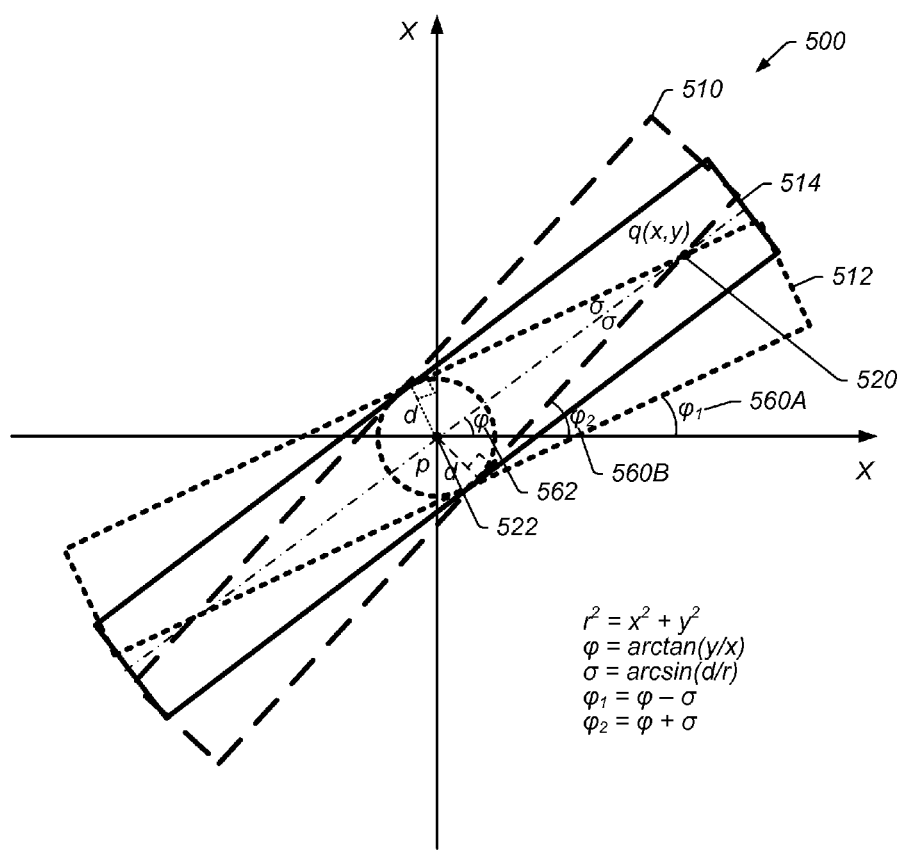
FIG. 5A shows an exemplary beam that can be parametrized with the Hough transform, according to some embodiments.

In some embodiments, the method may also use a threshold d, which may be substantially equal to the maximum half stoke width of detectible edge. In some embodiments, the method may calculate values for x and y for each possible pixel q using p−q=(x, y) and $r=\sqrt{x^2+y^2}$. In some embodiments, the method may handle a special case where the value of r is smaller than the value of d by allowing a respective pixel q to vote for all the bins. Otherwise, the pixel q may vote for the bins between $\phi_1$ 560A and $\phi_2$ 560B for a given pixel q, where $$\varphi_1 = \arctan\frac{y}{x} - \arcsin\frac{d}{r} \text{ and } \varphi_2 = \arctan\frac{y}{x} + \arcsin\frac{d}{r},$$

as illustrated in FIG. 5A.

For example, for a q pixel 408 with a value of 150 (i.e., located in the $1^{st}$ row, $4^{th}$ column of FIG. 4A), the (x, y) coordinates may be (0, −3) as computed from the center p pixel. In this example, ranges of angles $\phi_1$ and $\phi_2$ may be calculated for the pixel q 408 using the formulas given above. This calculation may be performed for most or all possible pixels q in the sliding window. In this example, the range of angles for pixel q 402 is 1.2302 to 1.9098 radians, as shown in element 402B.

In some embodiments, the method may also be operable to detect circular arcs with radius r and having a finite half stroke width d being centered at pixel p. Thus for the relaxed Hough Transform being applied to finding circular arcs, the method may calculate a range of radii (i.e., all the r's) for the each of the one or more edge pixels that contains one or more rings that pass through both the each of the one or more edge pixels q and the center pixel p.

FIG. 4C—Matrix of a Range of Quantized Voting Angles for Pixels of a Sliding Window FIG. 4C is an exemplary matrix of a range of quantized voting angles 400C for pixels of an exemplary sliding window, according to some embodiments. In this example, the method may quantize the angles of FIG. 4B into ten bins (i.e., each bin having 2*Π/10 radians), wherein "Π" may be referred to as "Pi". It is noted that the actual number of a histogram bins (e.g., a histogram of FIG. 4D) used by the method may be much greater (e.g., 100 bins), meaning that each bin may hold a much smaller range of angles than shown in the exemplary matrix 400C of FIG. 4C.

In this example, the method may convert the range of angles of FIG. 4B into the ranges of bins as shown in FIG. 4C. For example, the range of angles for the pixel q 408 of FIG. 4A with a value of 150 may be 1.23 to 1.91 radians (as shown by element 408B), which may be converted to bin 1 through bin 3 (as shown by element 402C with a value of [1, 3]). In other words, pixel q may vote for three bins: bin 1, bin 2, and bin 3.

Furthermore, as indicated above, in some embodiments there may be a special case where r is smaller than the value of d, in which case the method may allow pixel q 408 to vote for all the bins. An exemplary pixel q 410 of FIG. 4A may have an associated range of angles from 0 to 2*Pi (as shown by element 410B with a value of [0 to 6.28 radians]), which may convert to a range that includes all of the bins (i.e., bin 0 to bin 9), as shown by element 410C with a value of [0, 9]. Similarly, the center pixel 402 also may have an associated range of angles from 0 to 2*Pi (as shown by element 402B with a value of [0 to 6.28 radians]), which may convert to a range that includes all of the bins (i.e., bin 0 to bin 9), as shown by element 410B with a value of [0, 9]. The center p pixel may not be counted as there may be infinite number of lines that go through this pixel, i.e., if pixels p and q are the same pixel.

Just to clarify, in the notation used in FIG. 4C, the marked range of [9, 9] [0, 0] of element 415C means that the corresponding pixel 415 of FIG. 4A has an votes for two bins only, specifically bin 0 and bin 9, but not all the bins contained in the range of bin 0 through bin 9.

Figure 5B:
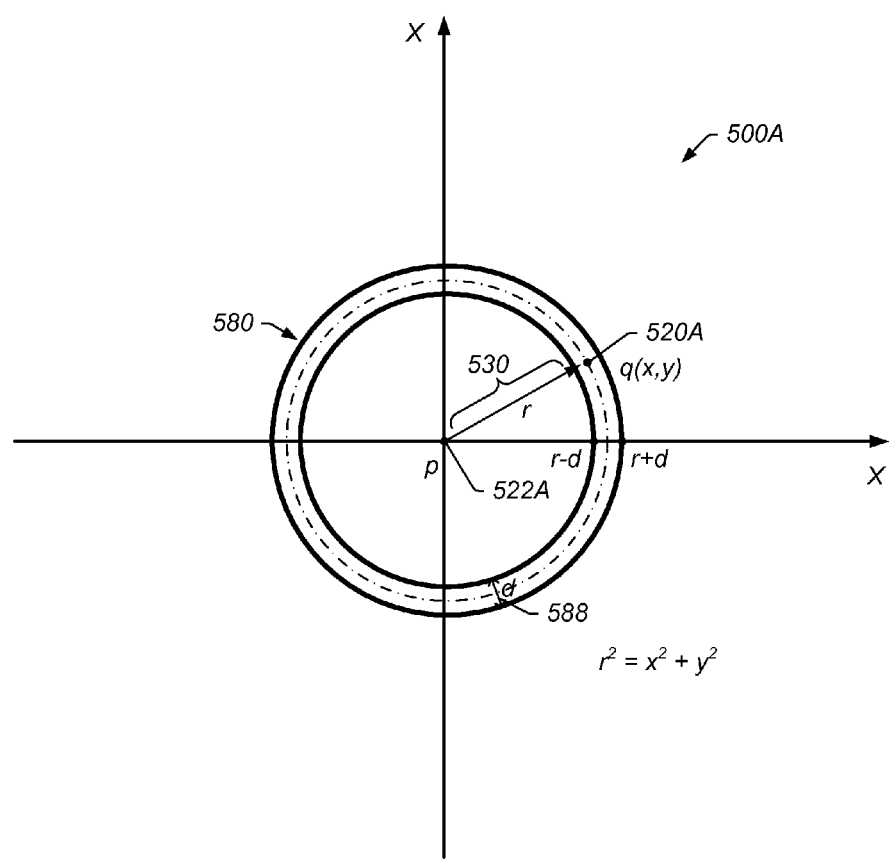
FIG. 5B shows an exemplary ring that can be parametrized with the Hough transform, according to some embodiments.

In case of finding circular arcs, the method may calculate (quantize) bins for various radii r, i.e., a range of radii (such as shown in FIG. 5B).

FIG. 4D—Histogram of Exemplary Bins For Pixel Voting

FIG. 4D shows an exemplary histogram with quantized bins corresponding to a weighted counting of the quantized ranges of voting angles for pixels of an exemplary sliding window, according to some embodiments. The following example shows weighted counting of votes using the exemplary matrices of FIGS. 4A-C.

For each pixel of FIG. 4A, the method may sum the values of pixels for each bin. Thus for pixel q in row 1, column 4, the method may place a value of 150 in each of the bins 1, 2, and 3. Similarly, for the next pixel (row 1, column 5), the method may place a value of 255 in bins 2 and 3. After the voting and summing is done, the resultant bins may hold the exemplary values shown in FIG. 4D.

In some embodiments, the method may simply sum the value of pixels for each bin using binary votes, i.e., using a binary value instead of a weighted value. Thus the calculation may be performed substantially similar to that described above, except that for pixel q in row 1, column 4, the method may place a value of 1 in each of the bins 1, 2, and 3, and 0 for the other bins. Similarly, for the next pixel (row 1, column 5), the method may place a value of 1 in bins 2 and 3, and zero for the other bins. After the voting and summing is done, the resultant bins may hold the values in a similar fashion to that shown in FIG. 4D. Thus the use of a range of bins for a histogram may be used independently of the weighted voting.

For the case of finding circular arcs, the method may use each pixel q to contribute votes to one or more quantization bins in the interval [r−d, r+d] along the radial direction, as illustrated in FIG. 5B.

FIG. 4E—Chart of an Exemplary Histogram with Bins for Pixel Voting

FIG. 4E is a chart of an exemplary histogram of exemplary bins corresponding to a weighted counting of the quantized ranges of voting angles for pixels of an exemplary sliding window, according to some embodiments. Thus FIG. 4E is a histogram of the values of the bins of FIG. 4D, i.e., FIG. 4E simply shows a bar graph of the counted histogram of FIG. 4D.

FIG. 4F—Histogram with Merged Bins with Voting Sums

FIG. 4F shows an exemplary merged histogram with merged bins corresponding to a weighted counting of the quantized ranges of voting angles for pixels of an exemplary sliding window, according to some embodiments. In this example, bins separated by value of Π may be merged. For example, bins 4 and 9 of the histogram of FIG. 4D may be merged together.

FIG. 4G—Chart of an Exemplary Histogram with Merged Bins

FIG. 4G is a chart of an exemplary histogram of merged exemplary bins of FIG. 4F corresponding to weighted counting of the quantized ranges of voting angles for pixels of an exemplary sliding window, according to some embodiments. Thus FIG. 4G simply shows a bar graph of the merged counted histogram of FIG. 4F.

FIG. 5A-B—Exemplary Figures that can be Parametrized

FIG. 5A shows an exemplary beam that can be parametrized with the Hough transform, according to some embodiments. Specifically, this figure shows the x-y relationship between the location of the p pixel 522, the q pixel 520, and possible beams 510, 512, and 514, that can pass through these two points. In other words, FIG. 5A illustrates the concept that the relaxed Hough transform may operate to find two or more beams, such as the beams 510, 512, and 514, with some finite width that incorporate two points (e.g., pixel p and one of possible pixels q), as opposed to just finding a line through these points (e.g., a line though points p 522 and q 520) with a single pixel width.

Specifically, FIG. 5A shows location of an exemplary p pixel 522 and an exemplary q pixel 520 that can be used in the calculations described above. In some embodiments, the method may operate to calculate angles $\phi_1$ 560A and $\phi_2$ 560B of between pixel p 522 and a given pixel q 522 that show possible beams 510, 512, and 514, that may pass through these points p 522 and q 520. The method may perform this for other possible points q out of the pixels in a sliding window.

FIG. 5B shows an exemplary ring that can be parametrized with the Hough transform, according to some embodiments. Specifically, FIG. 5B shows the x-y relationship between the location of a p pixel 522A, a q pixel 520A, and possible ring(s), each having a radius r with a finite width d, that can pass through these two points. In other words, FIG. 5B shows that the relaxed Hough transform may find a ring 580 with a finite width d 588 that incorporates these two points, as opposed to just finding a circle through these points with a single pixel width. Thus the method may find multiple rings 580 that have various widths d 588.

It is noted that in some embodiments, the techniques described herein may be performed first on a lower resolution version of an image first, and then refinements may be made on a higher or original resolution version of the image. For example, and image may first be down-sampled to a lower resolution, and the methodology described above may be applied to the lower resolution version. Results may be applied to the original image and refinements may then be made to the feature detection.

Figure 6:
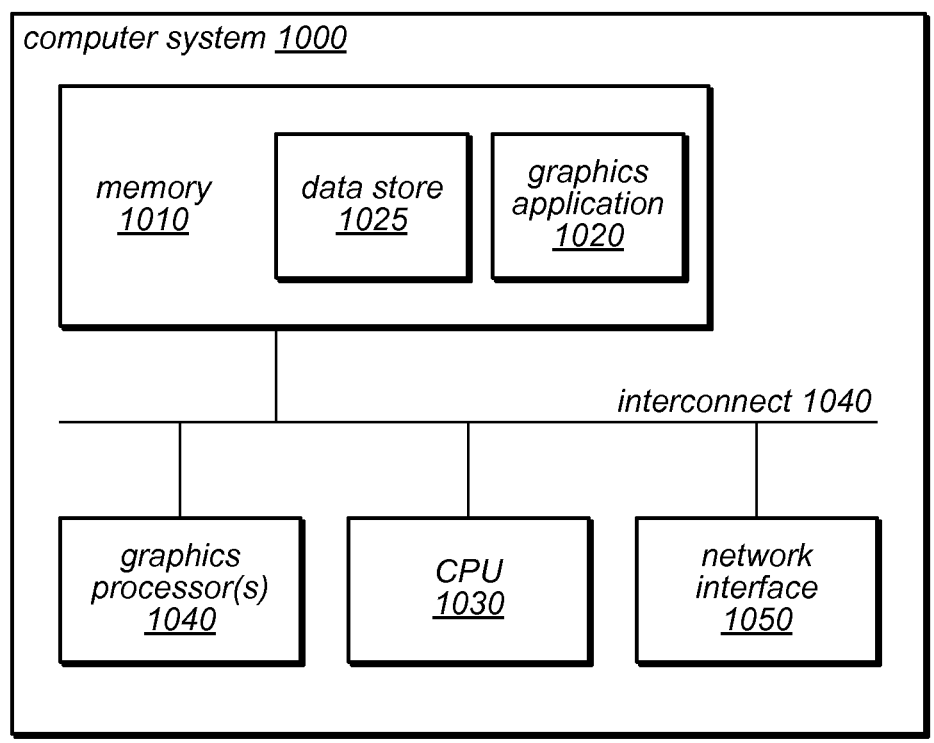
FIG. 6 is a block diagram of an exemplary computer system that can implement the use of the filter tool, according to some embodiments.

FIG. 6—Exemplary Computer System

FIG. 6 is a block diagram illustrating one embodiment of a computer system 1000 suitable for implementing the methods for use of the relaxed Hough transform, described herein. A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 1020.

A graphics application such as graphics application 1020 may be configured to convert a portion of an image to another domain, such as a gradient domain. Graphics application 1020 may represent various types of graphics applications, such as painting, publishing, photography, games, animation, and other applications. Additionally, graphics application 1020 may utilize a graphics processor 1040 when rendering, displaying, or operating on the images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030.

As described above, the methods disclosed herein for converting a portion of the image to another domain, calculating the possible beams, and/or computing the histogram values may be implemented by program instructions configured for parallel execution on two or more such GPUs.

Please note that functionality and/or features described herein as being part of, or performed by, graphics application 1020 may, in some embodiments, be part of, or performed by, one or more graphics processors, such as graphics processor 1040. As described above, in some embodiments, graphics application 1020 may be configured to render altered images into a separate image layer or separate layered window than input images.

Performing one or more of the elements of the relaxed Hough transform, as described herein, may be implemented on various types of computer systems. Referring again to FIG. 6, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1020 described herein may be provided as a computer program product, or software, that may include a computer-readable storage medium having stored thereon instructions, which may be used to program a computer system (or other electronic devices) to implement the methods described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

In some embodiments, memory 1010 may include program instructions configured to implement graphics application 1020, as described herein. Graphics application 1020 may be implemented in any of various programming languages or methods. For example, in one embodiment, graphics application 1020 may be JAVA based, while in another embodiments, it may be implemented using the C or C++ programming languages. In other embodiments, graphics application 1020 may be implemented using specific graphic languages specifically for developing programs executed by specialize graphics hardware, such as GPU 1040. In addition, graphics application 1020 may be embodied on memory specifically allocated for use by graphics processor(s) 1040, such as memory on a graphics board including graphics processor(s) 1040. Thus, memory 1010 may represent dedicated graphics memory as well as general-purpose system RAM.

Memory 1010 may in some embodiments also include a data store 1025. Data store 1025 may be configured to store image data for one or more input images and/or filtered output images, in various embodiments. Data store 1025 may also be configured to store various information related to calculating the strength of pixels and/or applying the bilateral blur tool, in some embodiments. Information stored in data store 1025 may be organized in any of various data structures, such as in one or more tables, databases, or arrays, and/or may be included in one or more files of any suitable computer-readable format, in various embodiments. Other information not described herein may be included in memory 1010 and/or data store 1025 and may be used to implement the methods described herein and/or other functionality of computer system 1000.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 6, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 6.

While graphics application 1020, which may implement one or more elements of the relaxed Hough transform, has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
    converting a portion of an image from a first domain to a second domain to generate a converted portion of the image, wherein the portion of the image comprises a plurality of pixels, wherein each pixel has a value, wherein the converted portion of the image comprises gradient magnitudes corresponding to changes in values for respective pixels in the portion of the image, wherein the plurality of pixels comprises a center pixel;
    finding one or more edge pixels in the portion of the image using a weight function applied to a gradient magnitude of the one or more edge pixels, the weight function being based on an angle between a gradient direction of the one or more edge pixels, and a line between the one or more edge pixels and the center pixel;
    using each of the one or more edge pixels and the center pixel, calculating a range of radii for each of the one or more edge pixels that contains one or more rings that pass through both the edge pixel and the center pixel;
    using the range of radii for each of the one or more edge pixels, voting for each of the one or more edge pixels in a histogram having plurality of bins, wherein each bin of the plurality of bins corresponds to a quantization of radii; and
    using the histogram, detecting one or more features in the portion of the image.

2. The method of claim 1, wherein one or more of the edge pixels is found to be an edge pixel based on its respective gradient having a direction that is orthogonal within a specified amount to a line between the first pixel and the center pixel.

3. The method of claim 1, wherein said finding the one or more edge pixels in the portion of the image comprises using pixels of the plurality of pixels having a gradient magnitude greater than a first threshold.

4. The method of claim 1, wherein the one or more rings have a maximum predetermined width.

5. The method of claim 1, wherein said detecting the one or more features comprises:
    combining votes in the histogram corresponding to a same edge direction to create a merged histogram;
    finding candidates for the one or more features based on peaks in the merged histogram.

6. The method of claim 5, further comprising:
    merging two or more peaks in the histogram if the distance between the two or more peaks is smaller than a second threshold.

7. The method of claim 1, wherein said voting comprises using binary votes.

8. The method of claim 1, wherein said voting comprises using weighted votes, wherein each weighted vote corresponds to a respective gradient magnitude for each pixel.

9. The method of claim 1, further comprising:
    un-warping the image prior to said converting, wherein said un-warping operates to correct one or more geometric distortions in the image.

10. The method of claim 1, further comprising:
    un-warping the image during one or more of said finding, said calculating, or said voting;
    wherein said un-warping operates to correct one or more geometric distortions in the image.

11. The method of claim 1, wherein a sliding window is used to define the portion of the image, and wherein the method further comprises moving the sliding window to one or more other portions of the image to detect one or more features in the one or more other portions of the image.

12. A system, comprising:
one or more processors; and
a memory coupled to the one or more processors, wherein the memory stores program instructions executable by the one or more processors to perform operations including:
converting a portion of an image from a first domain to a second domain to generate a converted portion of the image, wherein the portion of the image comprises a plurality of pixels, wherein each pixel has a value, wherein the converted portion of the image comprises gradient magnitudes corresponding to changes in values for of pixels comprises a center pixel;
finding one or more edge pixels in the portion of the image;
using each of the one or more edge pixels and the center pixel, calculating a range of radii for each of the one or more edge pixels that contains one or more rings that pass through both the edge pixel and the center pixel;
using the range of radii for each of the one or more edge pixels, voting for each of the one or more edge pixels in a histogram having plurality of bins, wherein each bin of the plurality of bins corresponds to a quantization of radii; and
using the histogram, detecting one or more features in the portion of the image by;
combining votes in the histogram corresponding to a same edge direction to create a merged histogram; and
finding candidates for the one or more features based on peaks in the merged histogram.

13. The system of claim 12, wherein a first pixel of the plurality of pixels is found to be an edge pixel according to a weight function on its gradient magnitude, wherein the weight function is dependent on an angle between the first pixel's gradient direction and a line between the first pixel and the center pixel.

14. The system of claim 12, wherein a first pixel of the plurality of pixels is found to be an edge pixel only if its respective gradient has a direction that is orthogonal within a specified amount to a line between the first pixel and the center pixel.

15. The system of claim 12, wherein said voting comprises using binary votes.

16. The system of claim 12, wherein said voting comprises using weighted votes, wherein each weighted vote corresponds to a respective gradient magnitude for each pixel.

17. The system of claim 12, wherein a sliding window is used to define the portion of the image, and wherein the operations further include moving the sliding window to one or more other portions of the image to detect one or more features in the one or more other portions of the image.

18. A computer-readable storage medium storing program instructions executable to implement operations comprising:
un-warping an image to correct one or more geometric distortions in the image;
converting a portion of the image from a first domain to a second domain to generate a converted portion of the image, wherein the portion of the image comprises a plurality of pixels, wherein each pixel has a value, wherein the converted portion of the image comprises gradient magnitudes corresponding to changes in values for respective pixels in the portion of the image, wherein the plurality of pixels comprises a center pixel;
finding one or more edge pixels in the portion of the image;
using each of the one or more edge pixels and the center pixel, calculating a range of radii for each of the one or more edge pixels that contains one or more rings that pass through both the edge pixel and the center pixel;
using the range of radii for each of the one or more edge pixels, voting for each of the one or more edge pixels in a histogram having plurality of bins, wherein each bin of the plurality of bins corresponds to a quantization of radii; and
using the histogram, detecting one or more features in the portion of the image.

19. The computer-readable storage medium of claim 18, wherein a first pixel of the plurality of pixels is found to be an edge pixel according to a weight function on its gradient magnitude, wherein the weight function is dependent on an angle between the first pixel's gradient direction and a line between the first pixel and the center pixel.

20. The computer-readable storage medium of claim 18, wherein a first pixel of the plurality of pixels is found to be an edge pixel only if its respective gradient has a direction that is orthogonal within a specified amount to a line between the first pixel and the center pixel.

21. The computer-readable storage medium of claim 18, wherein said detecting the one or more features comprises:
combining votes in the histogram corresponding to a same edge direction to create a merged histogram;
finding candidates for the one or more features based on peaks in the merged histogram.

22. The computer-readable storage medium of claim 18, wherein said voting comprises using binary votes.

23. The computer-readable storage medium of claim 18, wherein said voting comprises using weighted votes, wherein each weighted vote corresponds to a respective gradient magnitude for each pixel.

24. The computer-readable storage medium of claim 18, wherein a sliding window is used to define the portion of the image, and wherein the operations further include moving the sliding window to one or more other portions of the image to detect one or more features in the one or more other portions of the image.

* * * * *

UNITED STATES PATENT AND TRADEMARK OFFICE
CERTIFICATE OF CORRECTION

PATENT NO. : 8,526,731 B2  
APPLICATION NO. : 13/621180  
DATED : September 3, 2013  
INVENTOR(S) : Xinju Li et al.

Page 1 of 1

It is certified that error appears in the above-identified patent and that said Letters Patent is hereby corrected as shown below:

On the Title Page, Item 75, between "...Jen-" and "Chien...", delete "Chen" and insert --Chan--, therefor.

Signed and Sealed this  
Twelfth Day of November, 2013

Teresa Stanek Rea  
*Deputy Director of the United States Patent and Trademark Office*